US007734059B2

(12) United States Patent
Kase et al.

(10) Patent No.: US 7,734,059 B2
(45) Date of Patent: Jun. 8, 2010

(54) METHOD AND ITS PROGRAM FOR CELL LABELING OF VOLUME DATA

(75) Inventors: Kiwamu Kase, Saitama (JP); Yoshinori Teshima, Saitama (JP); Shugo Usami, Saitama (JP); Masaya Kato, Saitama (JP)

(73) Assignee: Riken, Saitama (JP)

( * ) Notice: Subject to any disclaimer, the term of this patent is extended or adjusted under 35 U.S.C. 154(b) by 757 days.

(21) Appl. No.: 11/568,669

(22) PCT Filed: Apr. 25, 2005

(86) PCT No.: PCT/JP2005/007777
§ 371 (c)(1),
(2), (4) Date: Nov. 3, 2006

(87) PCT Pub. No.: WO2005/109255
PCT Pub. Date: Nov. 17, 2005

(65) Prior Publication Data
US 2007/0233432 A1 Oct. 4, 2007

(30) Foreign Application Priority Data
May 6, 2004 (JP) ............... 2004-137674

(51) Int. Cl.
G06F 17/50 (2006.01)
G06K 9/10 (2006.01)
(52) U.S. Cl. ............... 382/100; 345/419; 703/1
(58) Field of Classification Search ............... 382/100; 703/1; 345/419
See application file for complete search history.

(56) References Cited
U.S. PATENT DOCUMENTS 7,088,363 B2    8/2006  Kase et al.
2005/0162418 A1*  7/2005  Kase ............... 345/419

FOREIGN PATENT DOCUMENTS

EP  1 507 220 A1  2/2005
JP  08-096025     4/1996

(Continued)

OTHER PUBLICATIONS

Rosenfeld, Azriel et al., "Digital Picture Processing," 1976, pp. 332-357.

(Continued)

Primary Examiner—Vu Le
Assistant Examiner—Amara Abdi
(74) Attorney, Agent, or Firm—Griffin & Szipl, P.C.

(57) ABSTRACT

By external data acquisition means using a computer, external data comprised of boundary data for an object is obtained; by external data input means, the external data are inputted into the computer; by cell dividing means, the external data are divided to rectangular parallelepiped cells that boundary planes intersect perpendicularly; by cell sorting means, the individual cells are sorted into boundary cells that include boundary data and non-boundary cells that do not include boundary data; by space sorting means, respective spaces are assigned to different space numbers where the cells are partitioned according to the boundary data; and by space number compression means, adjacent cells are reassigned to the same space numbers for cells that are not partitioned according to the boundary data.

8 Claims, 7 Drawing Sheets

FOREIGN PATENT DOCUMENTS

| | | |
|---|---|---|
| JP | 08-153214 | 6/1996 |
| JP | 2000-076485 | 3/2000 |
| JP | 2001-014492 | 1/2001 |
| JP | 2002-230054 | 8/2002 |
| JP | 2003-044528 | 2/2003 |
| JP | 3468464 | 9/2003 |
| JP | 2003-330976 | 11/2003 |
| JP | 2004-334640 | 11/2004 |
| WO | 03/048980 A1 | 6/2003 |
| WO | 03/073335 A1 | 9/2003 |
| WO | 03/098489 A1 | 11/2003 |

OTHER PUBLICATIONS

O'Rourke, Joseph, "Computational Geometry in C," Second Edition, pp. 246-253, 1998.

Rosenfeld, Azriel et al., "Digital Picture Processing," pp. 350-357, 1976.

Curless, Brian et al., "A Volumetric Method for Building Complex Models from Range Images," pp. 1-10, 1996.

Szeliski, Richard, "Rapid Octree Construction from Image Sequences," CVGIP: Image Understanding, vol. 58, No. 1, pp. 23-32, Jul. 1993.

Pulli, Kari et al., "Robust Meshes from Multiple Range Maps," Proceedings of International Conference on Recent Advances in 3-D Digital Imaging and Modeling, 1997.

Yonekawa, Kazutoshi et al., "A Geometric Modeler by Using Spatial-Partitioning Representations," vol. 37, No. 1, pp. 60-69, Jan. 1996.

Morimoto, Keiu et al., "Recursive Subdivision Methods and Subspace Classification—The Extension to Curves with Self-intersections and Overlaps-," vol. 37, No. 12, pp. 2223-2234, Dec. 1996.

Weiler, Kevin, "The Radial Edge Structure: A Topological Representation for Non-Manifold Geometric Boundary Modeling," Geometric Modeling for CAD Applications, pp. 3-36, 1988.

Cavalcanti, Paulo Roma et al., "Non-manifold modelling: an approach based on spatial subdivision," Computer-Aided Design, vol. 29, No. 3, pp. 209-220, 1997.

International Search Report issued in corresponding application No. PCT/JP2005/007777 completed Jun. 17, 2005 and mailed Jul. 5, 2005.

Kase, K., et al., "Volume CAD", Volume Graphics, Jul. 7, 2003, pp. 145-150, and p. 173.

Lorenson, W.E., et al., "Marching Cubes: A High Resolution 3D Surface Construction Algorithm", Computer Graphics, vol. 21, No. 4, Jul. 1987, pp. 163-169.

International Search Report issued in corresponding application No. EP 05734615.7, completed Oct. 26, 2009, mailed Nov. 2, 2009.

* cited by examiner boundary cell 13a

PRIOR ART

METHOD AND ITS PROGRAM FOR CELL LABELING OF VOLUME DATA

This is a National Phase Application in the United States of International Patent Application No. PCT/JP2005/007777 filed Apr. 25, 2005, which claims priority on Japanese Patent Application No. 137674/2004, filed May 6, 2004. The entire disclosures of the above patent applications are hereby incorporated by reference.

BACKGROUND OF THE INVENTION

1. Technical Field of the Invention

The present invention relates to a method and a program for cell labeling of volume data, for dividing space defined by boundary data that include one medium, or multiple-media, more than two, branching faces, holes, open shells, etc., and that are not always closed.

2. Description of the Related Art

In the research development or technology development field, CAD (Computer Aided Design), CAM (Computer Aided Manufacturing), CAE (Computer Aided Engineering) and CAT (Computer Aided Testing), for example, are employed as supporting means respectively for design, manufacturing, analyzing and testing.

Further, one set of volume data is co-owned to be used for sequentially performing different simulations, or for interacting simulation results with a manufacturing process, and this has gradually been spreading.

According to the conventional supporting means described above, the boundary face of a target or an objective article has an important meaning, and frequently, for example, the target is represented by using a boundary, and the inside of the boundary face is dealt with uniformly. In this case, inside/outside determining means is necessary for determining which is the inside or the outside of a two-dimensional or three-dimensional boundary plane or planes.

As conventionally known inside/outside determining means, there are (1) a ray crossing method (non-patent document 1), (2) a region growing (extending) method using boundary tracing (non-patent document 2), (3) a raster tracing in image processing (non-patent document 3), (4) a multi-directional tracing (non-patent document 2), (5) a method provided by Curless (non-patent 3), (6) a method provided by Szelistki or a method provided by Pulli, due to the use of an octree (non-patent document 5), and (7) non-patent documents 6 and 7 and patent documents 1 through 3. Furthermore, relevant patent documents 4 through 7 are publicly disclosed by the applicant the same as that of the present invention.

[Non-patent Document 1]

J. O'Rourke, "Computational Geometry in C (Second Edition"), p. 246, Cambridge University Press, 1998

[Non-patent Document 2]

Rosenfeld & Kak, translated by Nagao, "Digital image processing", Modern Science Co., Ltd., pp. 332-357)

[Non-patent Document 3]

B. Curless and M. Levoy, "A Volumetric Method for Building Complex Models from range images.", In Proceedings of SIGGRAPH '96, pages 303-312, August 1996)

[Non-patent Document 4]

R. Szeliski. "Rapid octree construction from image sequences."

[Non-patent Document 5]

K. Pulli, T. Duchamp, H. Hoppe, J. McDonald, L. Hapiro, W. Stuetzle., "Robust meshes from multiple range maps." Proceedings of International Conference on Recent Advances in 3-D Digital Imaging and Modeling, May 1997, pages 205-211.

[Non-patent Document 6]

Yonekawa, Kobori and Hisatsuwa, "Shape modeler using spatial division model", Bulletin of Information Processing Society of Japan, Vol. 37, No. 1, pp. 60-69, 1996

[Non-patent Document 7]

Morimoto and Yamaguchi, "Recursive spatial division method and partial spatial classification, self crossings, and extension to overlapping curve", Journal of Information Processing Society of Japan, Vol. 37, No. 12, December 1996

[Non-patent Document 8]

Weiler, K., The radial-edge structure: A topological representation for non-manifold geometric boundary representations, In Geometric Modeling for CAD Applications, North-Holland, (1988), pp. 3-36.

[Non-patent Document 9]

Cavalcanti, P. R., Carvalho, P. C. P., and Martha, L. F., Non-manifold modeling: an approach based on spatial subdivision, Computer-Aided Design, 29(3), (1997), pp. 209-220.

[Patent Document 1]

Japanese Laid-Open Patent Application Publication No. H8(1996)-96025, "Graphic Processing Method And Appratus for Same"

[Patent Document 2]

Japanese Laid-Open Patent Application Publication No. H8(1996)-153214, "Method for Generating Three-dimensional Orthogonal Grating Data"

[Patent Document 3]

Japanese Laid-Open Patent Application Publication No. 2003-44528, "Forming Method for Surface Grid of an Object"

[Patent Document 4]

Publication of the Japanese Patent No. 3,468,464, "Method for Storing Substance Data Obtained by Integrating Shape and Physical Property"

[Patent Document 5]

Japanese Laid-Open Patent Application Publication No. 2003-330976, "Inside/outside Determining Method for Boundary Data and Its Program"

[Patent Document 6]

International Publication No. 03/048980 pamphlet, "Method for Converting Tree-dimensional Shape Data into Cell Inner Data And Conversion Program"

[Patent Document 7]

International Publication No. 03/073335 pamphlet, "Method and Program for Converting Boundary Data into In-cell Shape"

The ray crossings method disclosed in non-patent document 1 is a method in which, when an input boundary face is present, whether the number of points where light (a ray) emitted by a specific point crosses the boundary is an even number or an odd number is determined, and when the number of points is an even number, it is determined that the visual point of the light ray is located outside an object, or when the number of points is an odd number, it is determined that the visual point is inside an object.

However, this means employed can not be applied when the light ray happens to contact a boundary, because a repeated root is provided, and thus, only one intersection point is obtained, while originally there are two intersection points. Therefore, there is also a problem in that this method can not be employed when boundary information is insufficient (when CAD data is to be read from different software, the missing of data sometimes occurs due to different ways of using expressions or due to an error in numerical values).

The region growing (extending) method, which employs boundary tracing in the image processing, to which only boundary information is given, is disclosed, for example, in non-patent documents 2, 8 and 9. However, there are problems such that the speed is slow because the performance of the process is extended toward the entire of the image, and identification can not be correctly performed when surface information is inadequate.

Raster tracing in the image processing is disclosed in non-patent document 2, and is a method whereby boundaries and a region sandwiched between the boundaries are traced while cells are scanned along a coordinate axis, such as the X-axis. Correct identification can not also be achieved with respect to an image obtained by quantizing inadequate boundary information (not a closed surface).

As a method for avoiding this, there is multi-directional tracing (the non-patent document 2), which is, however, low in the efficiency thereof.

The method offered by Curless for the reverse engineering field (method for reconstructing surface information based on a group of measurement points) is a robust method whereby external information, such as regularly arranged measurement points and directions of a plurality of cameras relative to a measurement object, is employed to define, for the entire field, an implicit function that is based on distance, and surface information is reconstructed. This method is disclosed in the non-patent document 3.

However, the method by Curless has drawbacks in the amount of data and the calculation time because distance field calculation is required for all of the cells. Further, a problem in accuracy is also pointed out, such that a distance function can not be correctly calculated for a thinner structure than the size of a cell and a face having an acute angle. This problem also results in an erroneous determination in the process of identification.

The method offered by Szeliski that uses an octree (the non-patent document 4) and the method offered by Pulli (the non-patent document 5) are also methods whereby relations between range data (distance data) for the obtained several targets and cells obtained by dividing a space using an octree are classified into three object divisions, i.e., inside, outside and boundaries, to thereby reconstruct the boundaries. According to these methods, since a projection operation is employed for each cell, a problem is encountered such that the processing is cumbersome and time-consuming and accordingly, calculations become unstable during the projecting operation.

A means disclosed in the non-patent document 6 can eventually express only two media by using three types of cells, i.e., outside, boundary and inside cells. Further, a problem must be encountered in which the expression is comprised of only a shape expression and no physical property value can be provided.

A means disclosed in the non-patent document 7 is directed to an inside/outside determining method used for input and branching, and is limited to two-dimensional sequential and finite use. Further, while a directed graph is employed, as one problem, this can not be employed for multi-media, three-dimensional use or discontinuous use.

Furthermore, the patent documents 1 through 3 disclose an art applicable to only two media, but to neither one medium nor three or more multi-media, and also are not applicable to any complicated surface data.

Additionally, although the patent documents 4 through 7 by the present Applicant are applicable to multi-media as a whole, the following problems, however, exist.

(1) It is difficult for a space to which multi-media belong to be partitioned along a boundary in a complicated shape.

(2) A limit exists in a target (boundary data) that can be dealt with as volume data proposed by the patent document 4.

In other words, when two manifolds, which are completely closed solids, are boundary data, dealing of multi-media is enabled. However, it is difficult to deal with boundary data such that a plurality of faces are branched from one side, or boundary data such that a hole is opened or is discontinued in the middle, i.e., it is difficult to deal with a non-manifold boundary, such as in the cases of face branching, a hole, an open shell, only one media, or three or more multi-media, etc.

It should be noted that, in the present invention, a manifold and a non-manifold are two-dimensional boundaries, and a solid, a volume, a medium and affiliated spaces are three-dimensional regions.

The present invention is contrived to solve the above-described problems. That is, an object of the present invention is to provide a method and a program for cell labeling of volume data, in which it is possible to deal with, as input targets, not only two outside and inside media, which are provided by boundary data for two manifolds that are completely closed solids, but also boundary data for a non-manifold that includes, for example, one medium that has an open shell boundary, three or more multi-media, face branching and a hole, and whereby a space partitioned by them can be divided in a quick and robust manner.

In other words, the object of the present invention is to provide a method and a program for cell labeling of volume data, in which different material (medium) information is added to each partitioned space segment, so as to be regarded as VCAD data (volume data), and various simulations are coupled/continued, and whereby volume data to which information has been added (also changed in a time series) can be employed for manufacturing and for an inspection, such as a comparison with a real object and an evaluation.

SUMMARY OF THE INVENTION

According to the present invention, there is provided a method for cell labeling of volume data, which is characterized by:

obtaining external data including boundary data for an object by means of an external data acquisition means through employment of a computer;

entering the external data into the computer by means of an external data input means;

dividing the external data into rectangular parallelepiped cells that boundary planes perpendicularly intersect by means of a cell dividing means;

sorting respective of the divided cells into boundary cells including boundary data and non-boundary cells including no boundary data by means of a cell sorting means;

assigning of different space numbers for respective spaces where the respective cells are partitioned according to the boundary data by means of a space sorting means; and resetting space numbers of adjacent cells that are not partitioned according to the boundary data to a same space number by means of a space number compression means.

Further, according to the present invention, there is provided a program for cell labeling of volume data, which performs:

an external data acquiring step of acquiring external data including boundary data for an object, through employment of a computer;

an external data input step of entering the external data into the computer;

a cell dividing step of dividing rectangular parallelepiped cells that boundary planes intersect perpendicularly;

a cell sorting step of sorting the individual cells into boundary cells that include boundary data and non-boundary cells that include no boundary data;

a space sorting step of assigning different space numbers for respective spaces where the cells are partitioned according to the boundary data;

a space number compression step of reassigning or resetting a same space number for space numbers of adjacent cells that are not partitioned according to the boundary data.

In accordance with the above-mentioned method and the program of the present invention, by the cell dividing means (cell dividing step) all the external data is divided into rectangular parallelepiped cells that boundary planes intersect perpendicularly, and by the cell sorting means (cell sorting step) the individual cells are sorted into boundary cells and non-boundary cells. Therefore, even when external data is a non-manifold that includes three or more multi-media, face branching, a hole, an open shell, etc., the external data is always sorted into boundary cells or non-boundary cells.

Further, since a rectangular parallelepiped cell is larger than the original boundary data, data including only one part of boundary data (e.g., one point) need only be regarded as a boundary cell, so that boundary data is always included in a boundary cell.

Furthermore, by the space sorting means (space sorting step) different space numbers are allocated to space segments obtained by partitioning cells according to boundary data, and by the space number compression means (space number compression step) the same space number to the adjacent cells that are not partitioned by boundary data are reallocated and have been allocated with different space numbers. Therefore, when external data are comprised of a non-manifold including an open shell of one medium, three or more multi-media, face branching, a hole, etc., different space numbers can be allocated directly.

Therefore, according to the method and the program of the present invention, not only two media, i.e., outside and inside media that employ, as a boundary, two manifolds that are completely closed solids, but also a non-manifold that includes one medium, three or more multi-media, face branching, a hole, an open shell, etc., can be dealt with as an input target (boundary data).

According to a preferred mode of the present invention, (A) when a cell is a non-boundary cell, by the space sorting means a single space number is set; and (B) when a cell is a boundary cell, by the space sorting means, for boundary data, a cutting point at which the ridge line of the boundary cell is cut, and a single or a plurality of cut triangles that are connected only along sides through the cutting point are set;

when there is a cutting point and no cut triangles, a single space number is set; and, when there are a plurality of cut triangles that are connected along sides, cycle search means for tracing a course for a cut triangle that shares a side, and has the smallest angle formed by faces, is performed for all the cut triangles.

According to this method, even when there are a plurality of cut triangles connected along their sides, different space numbers can be quickly and robustly designated for respective space segments partitioned by respective cut triangles. Therefore, when the number n of cells is large, the process for each cell is employed as a reference, so that the processing time is only on the order (proportional to n) of O (n), and a rapid process can be performed.

Furthermore, the calculation process is simple, and can be easily programmed, and can be easily loaded into a computer. Additionally, since different space numbers are provided for a plurality of spaces partitioned by boundary cells, there is little possibility that different spaces will be sorted into one space, and the method can be applied for a space with which multi-media can be expressed.

By the cycle search means, a space number for a medium by using a half space pointed at by a normal vector that is determined by a cycle of sides having a direction relative to obverse and reverse faces that constitute a cut triangle is designated. Further, by the cycle tracing means, two or more cut triangles which share sides and directions which are the opposite are traced, and when a cut triangle at the start is finally reached, a space number enclosed by a closed boundary is designated.

Using this method, an affiliated space is provided not for the vertex of a cell, but for the obverse and the reverse sides of boundary data (cell inner face). Thus, in a distributed environment for a plurality of computers or users, a medium and various attributes (or spaces to which attributes belong) can be obtained through cells.

Additionally, it is preferable that the cycle search means be performed sequentially or in a parallel distributed manner.

Using this method, the processing can be performed more quickly and robustly than by the non-patent documents 8 and 9, which are most similar to the present invention.

Furthermore, it is preferable that by the cell dividing means, octantal re-division of the rectangular parallelepiped cells is performed until appropriate cutting points are obtained, so as to reconstruct boundary shape elements that constitute the boundary planes that are included in the external data, or until an arbitrary number of times, determined by a user, is reached.

Since octantal division is performed by this method, data can be employed as VCAD data.

The space sorting means repetitively or recursively scans all the rectangular parallelepiped cells sequentially in the three directions X, Y and Z.

In the case of voxel data, scanning is repeated sequentially in the three directions X, Y and Z, and in the case of VCAD data, a recursive process is performed, so that all the rectangular parallelepipeds can be scanned sequentially.

It is preferable that the external data include physical property values for an object and others that enclose the object, and correlate, with the physical property values, the space numbers assigned by the space sorting means.

According to the above-described method and program for cell labeling of volume data in the present invention, not only outside and inside media employing, as boundaries, two manifolds that are completely closed solids, but also one medium, three or more multiple media and a non-manifold that includes face branching, a hold, an open shell, etc., can be handled as input targets (boundary data), and spaces defined by them can be sorted quickly and robustly.

Therefore, VCAD data (volume data) can be obtained by adding different material (medium) information to sorted spaces, and various simulations can be continuously carried out and continued. Further, the volume data to which the information (may be changed in the time series) is added can be employed for production and inspections, such as a comparison with a real object and an evaluation.

Thus, various applications are available, such as (1) structural analysis, large transformation analysis, thermal/hydraulic analysis, flow analysis, and simulations for removing, adding and transforming productions, (2) simulations and inspections for a case where an organism, such as a human body, and an artificial object, are present together, and design and production for an artificial object, and (3) design, analysis, assembling and inspections in a case in which a natural object, such as the crust of the earth, and an artificial object, such as a building, exist together.

DESCRIPTION OF THE PREFERRED EMBODIMENTS

A preferred embodiment of the present invention will now be described with reference to the drawings.

The inventors of the present invention have originated and already applied "method for storing substance data obtained by integrating shape and a physical property" (the patent document 4). This method relates to a substance data storage method, whereby substance data obtained by integrating a shape and a physical property can be stored by using storage having a small volume, and thus, the shape, the structure, the physical property information and the history of an object can be managed unidimensionally, so that the same data can be employed for the administration of data that are related to process sequences, such as designing, machining, assembling, inspecting and evaluating, and CAD and simulations can become unidimensional. Data employed for this method is called "V-CAD data" or "volume data", and a design or a simulation using this data is called "volume CAD" or "V-CAD".

A cell labeling method of the present invention is appropriately used, especially for volume data.

First, terms used for the present invention will be explained.

When boundary (surface) data to be input are present, the surface of a rectangular parallelepiped, such as a voxel or an octant of an octree, that is used for dividing a three-dimensional space and the internal area of the rectangular parallelepiped are called cells. A cell that has surface information is called a boundary cell, and a cell that does not have surface information is called a non-boundary cell (or called an inner cell in non-patent document 4).

In other words, boundary cells are those where an intersection with input boundary data is present inside the cell and either on the plane, along the ridge line or at the vertex of the cell that is the boundary of the cell. All the other cells are non-boundary cells. Cells adjacent to each other share only a cell boundary, regardless of the type. An object that has two manifolds as a boundary and that is filled three-dimensionally is called "space". When the individual spaces are not coupled with each other, they are identified as different spaces by using different space numbers. Therefore, an object is designated as a portion (set of points) enclosed by a boundary (surface) that is expressed by a closed curve, and in the actual world, is used as a unit that imposes limits on an object having the same material. On the other hand, a boundary that distinguishes different spaces is called a "boundary (the same definition as used in mathematics)", or a "surface".

Figure 1:
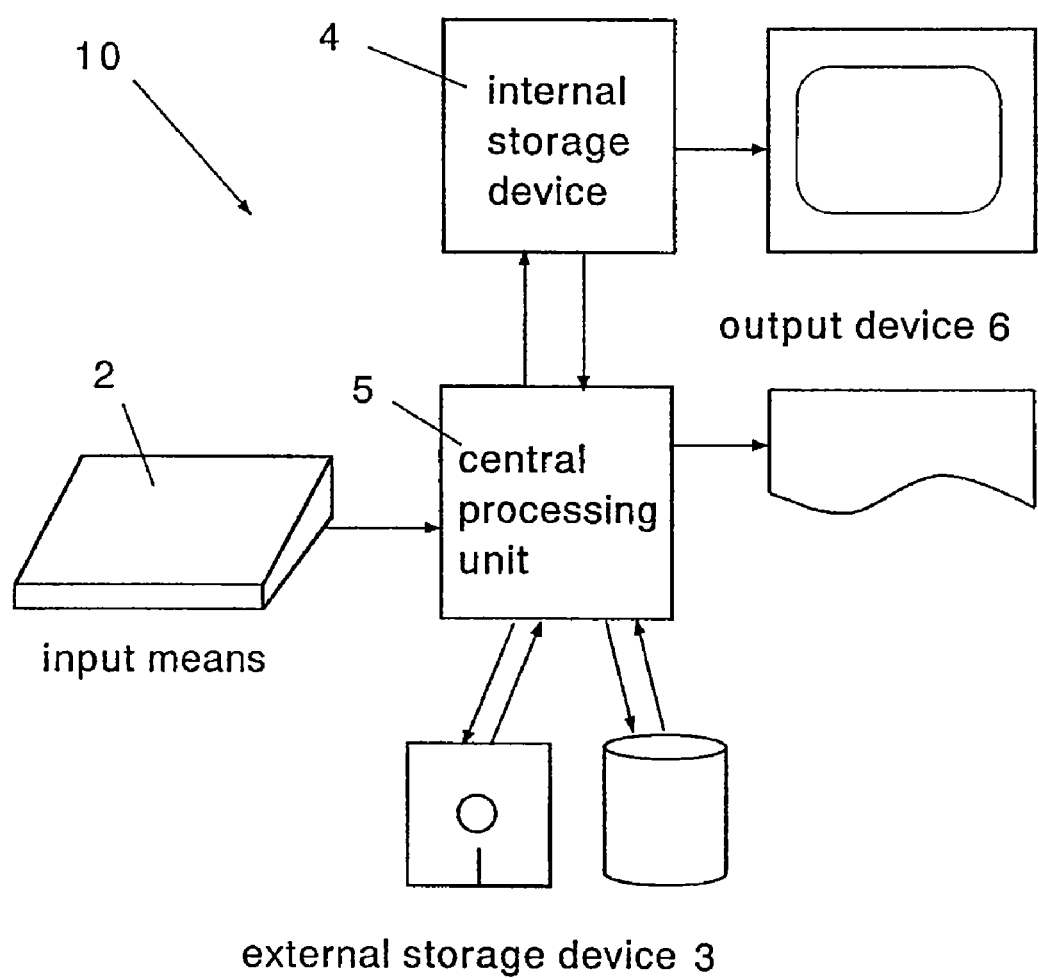
[FIG. 1] A diagram showing the configuration of an apparatus for executing a method according to the present invention.

FIG. 1 is a block diagram showing the configuration of an apparatus for executing the method of the invention. As shown in this drawing, a CAD apparatus 10 is provided with: external data input means 2, an external storage device 3, an internal storage device 4, a central processing unit 5 and an output device 6.

The external data input means 2 is, for example, a keyboard for entering external data consisting of boundary expression data for an object. The external storage device 3 is a hard disk, a floppy disk, a magnetic tape, a compact disk, etc., and stores volume data obtained by integrating a shape and a physical volume and a generation program for the volume data. The internal storage device 4 is, for example, a RAM, a ROM, etc., and stores computation information. The central processing unit (CPU) 5 concentrates on handling computation, input/output, etc., and executes a program, along with the internal storage device 4. The output device 6 is, for example, a display device and a printer, and outputs the volume data that is stored and the results obtained by executing the program.

The central processing unit 5, the internal storage device 4 and the external storage device 3 interact, and together serve as external data acquisition means, external data input means, cell dividing means, cell sorting means, space sorting means and space number compression means.

External data that are received from the external are polygon data representing a polygon, a tetrahedron or a hexahedron element to be used for the finite element method, curved surface data to be used for a three-dimensional CAD or CG tool, or data such that the surface of a three-dimensional object is expressed by using information configured by including partial planes and curved surfaces.

In addition to these data (called S-CAD data), the external data may be (1) data prepared directly by manual input via a V-CAD original interface (V-interface), and (2) data obtained by digitizing surfaces using a measurement device, a sensor or a digitizer, or (3) volume data that includes internal information, such as voxel data, used for CT scanning, MRI and general volume rendering.

Figure 2:
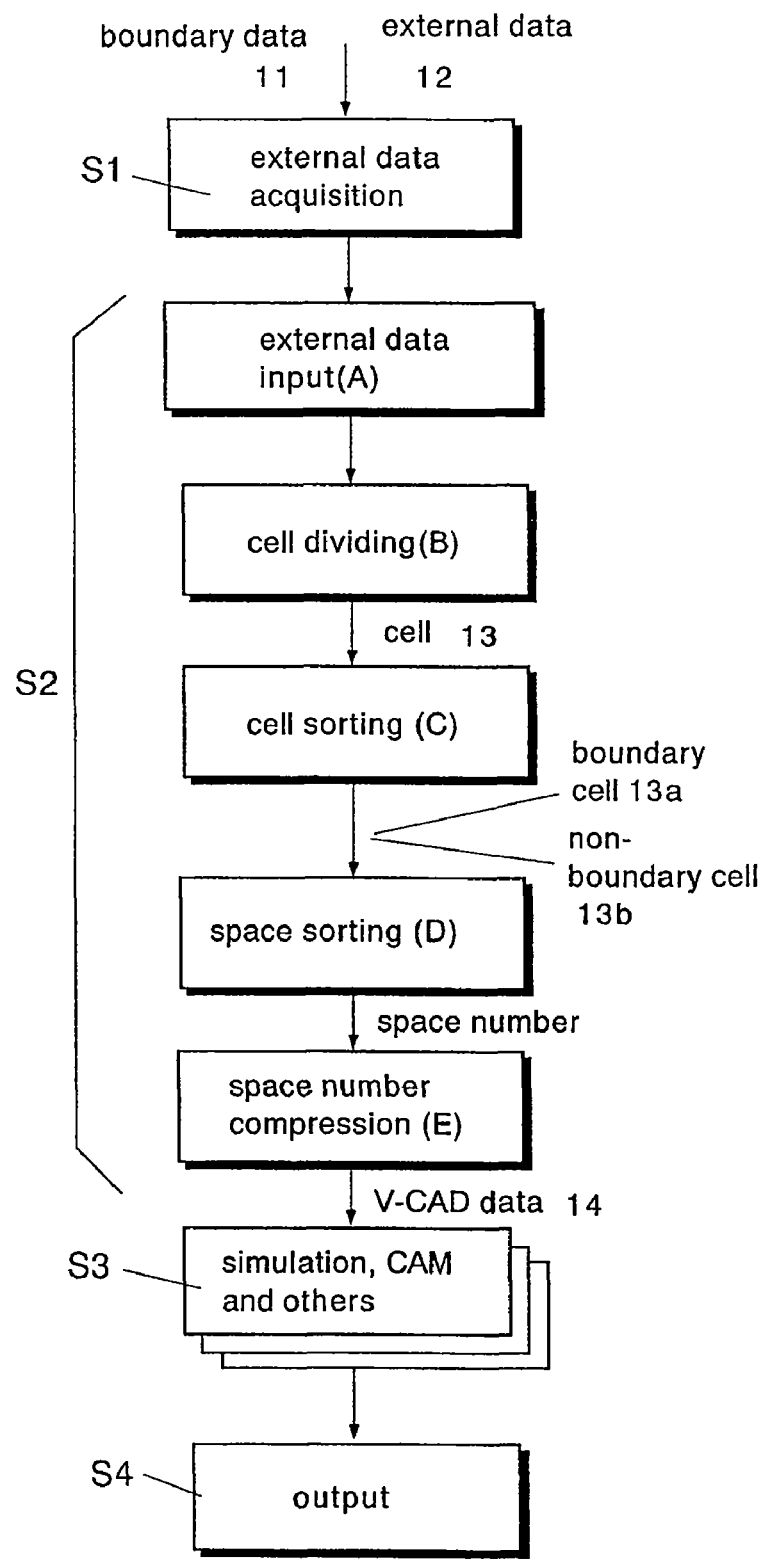
[FIG. 2] A flowchart showing a cell labeling method according to the present invention.
Figure 3A:
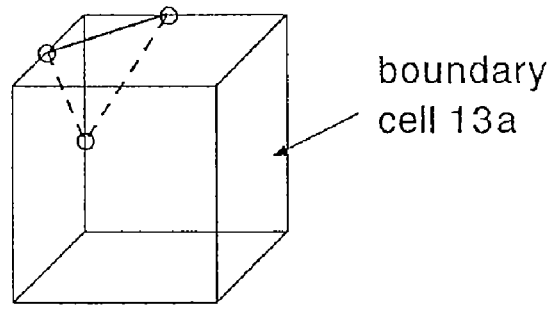
[FIG. 3] Views showing examples of boundary planes disclosed in the patent document 6.
Figure 3B:
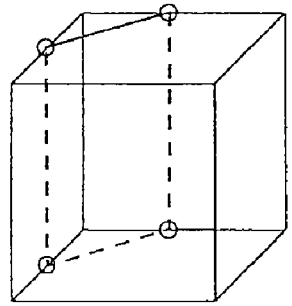
Figure 3C:
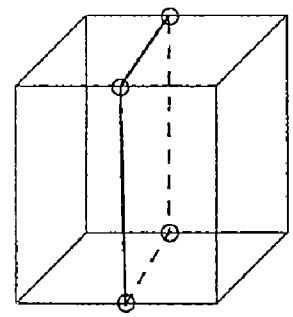
Figure 3D:
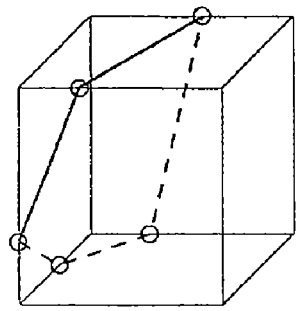
Figure 3E:
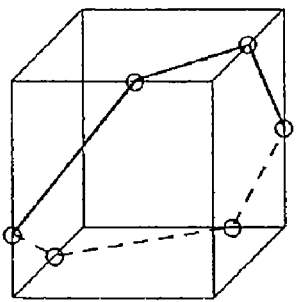

FIG. 2 is a flowchart for the cell labeling method of the present invention mounted to a computer. As shown in this drawing, the method of the present invention is the processing from external data acquisition S1 to the formation of V-CAD data 14 (or volume data), and includes external data acquisition means S1, external data input means A, cell dividing means B, cell sorting means C, space sorting means D and space number compression means E. Means from the external data input means A to the space number compression means E is referred to as volume data formation means S2.

Further, as shown in this drawing, following the volume data formation means S2, normally, simulation means S3 and output means S4 are performed, and as a whole, structural analysis, large transformation analysis, thermal/hydraulic analysis, flow analysis and the removing, adding or transforming simulation processing are performed by using a computer.

It should be noted that, hereinafter, the individual processes implemented by the external data acquisition means S1, the volume data formation means S2 (the external data input means A, the cell dividing means B, the cell sorting means C, the space sorting means D and the space number compression means E), the simulation means S3 and the output means S4 are referred to as an external data acquisition step S1, a volume data formation step S2 (an external data input step A, a cell dividing step B, a cell sorting step C, a space sorting step D and a space number compression step E), a simulation step S3 and an output step S4.

Furthermore, a cell labeling program for the present invention is a computer program that implements the external data input step A, the cell dividing step B, the cell sorting step C, the space sorting step D and the space number compression step E.

By the external data acquisition means S1 using a computer, external data 12 are obtained which comprised of boundary data and physical property values for an object 1.

By the external data input means A, the external data 12 are entered into a computer, etc., where the method of the invention is stored. The external data 12 are acquired by the external data acquisition means S1 and that are comprised of the boundary data and the physical property values of the object 1.

By the cell dividing means B, the external data 12 are divided into rectangular parallelepiped cells 13, where boundary planes intersect perpendicularly. The rectangular parallelepiped cells 13 may be cube cells.

By the cell sorting means C, the obtained cells are sorted into boundary cells 13a that include boundary data and non-boundary cells 13b that do not include boundary data.

By the space sorting means D, different spaces are set to numbers for individual spaces, where the individual cells are partitioned in accordance with the boundary data.

By the space number compression means E, the same space number is reallocated to adjacent cells that are not partitioned by boundary data.

By the simulation means S3 using the physical property values of the individual cells, for example, designing, analyzing and manufacturing, or to perform CAM (Computer Aided Manufacturing), assembling and testing simulations are performed. By the output means S4, simulation results are outputted to, for example, a printer, an external NC device, etc.

When the method of the present invention is applied for V-CAD data, by the cell dividing means B, the rectangular parallelepiped cells 13 should be re-divided, using an octree, until appropriate cutting points are obtained, so as to reconstruct boundary shape elements that structure the boundary planes included in external data. Further, when the method of the present invention is applied for the normal voxel data, the cell dividing means B performs division to obtain rectangular parallelepiped cells 13 of the same size.

FIG. 3 illustrates an example wherein boundary planes disclosed in the patent document 6 are employed as boundaries. In this case, when boundary data has a flat plane, there are three to six cutting points between the boundary plane and the ridge lines. It should be noted that the number of cutting points is not limited to that in this example, and in some cases, may be seven to twelve. Additionally, the present invention includes, as targets, not only outside and inside media, which are provided by boundary data for two manifolds that are completely closed solids, but also one medium, three or more multiple media and a non-manifold that includes face branching, a hole, an open shell, etc.

A boundary plane in an example boundary cell shown in FIG. 3 can be divided into one or a plurality of triangles that are formed by connecting cutting points. Among them, a triangle that is coupled with others, a plurality of cut triangles along only the sides of the cut triangles (a so-called kind of non-manifold state; hereinafter referred to as "branching" in the present invention) is employed as a target.

Each of such cut triangles includes (can designate) two types of affiliated spaces (half spaces in the three-dimensional Euclid space pointed by the normal vector in the right-hand screw-thread direction that is determined during one cycle), which are respectively specified by two cycles (normally called loops), i.e., an obverse cycle and a reverse cycle, that are determined depending on an arrangement of three of the cutting points.

As the general structure, it is assumed that a list of all the cut triangles included in a boundary cell has been prepared. It should be noted that the cut triangles may not be connected.

Figure 4:
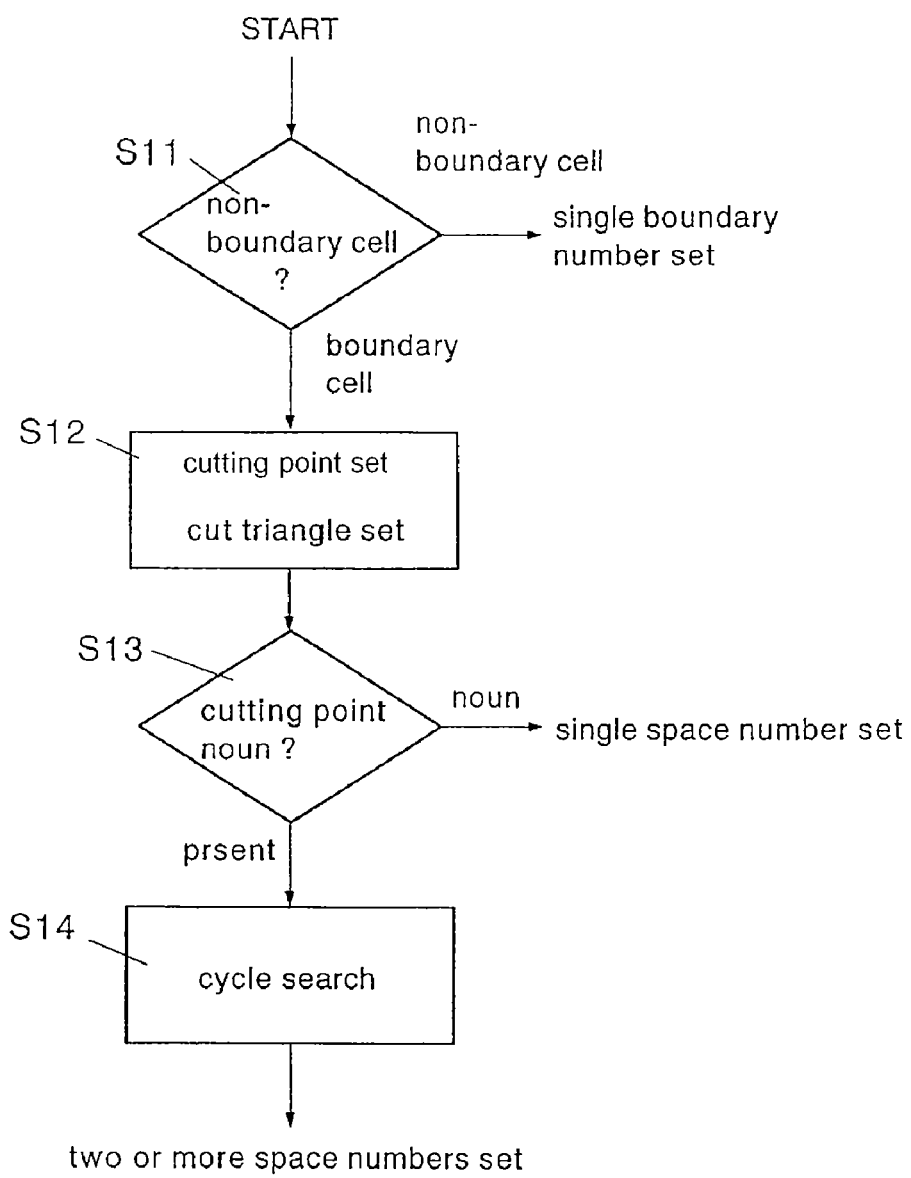
[FIG. 4] A flowchart for space sorting means D in FIG. 2.

FIG. 4 is a more detailed flowchart for the space sorting means D in FIG. 2. As shown in this drawing, when a cell is a non-boundary cell at step S11, by the space sorting means D one space number is set.

Further, when a cell is a boundary cell, at step S12, a cutting point, at which the ridge line is to be cut for boundary data, and a single or a plurality of cut triangles, which are connected by sides that run only to such cutting points, are designated.

Sequentially, at step S13, when a cutting point is present but a cut triangle is absent, a single space number is designated.

Finally, at step S14, when there are a plurality of cut triangles that are connected by sides, "cycle search means" is performed sequentially with all the cut triangles in order to set a different space number for each space defined with a cut triangle that shares a side and that has the smallest angle formed by its planes.

A space number k is an integer, for example, of 1, 2, 3, - - -, and should be used in the ascending order.

Additionally, the space sorting means sequentially scans all the rectangular parallelepiped cells 13 repetitively, or recursively, in the three directions X, Y and Z. When a boundary cell 13a is passed through during this scanning, a different space number (e.g., k=k+1) is set. Furthermore, when, during scanning, a space number has been set for an adjacent cell that is not partitioned by boundary data, a smaller space number should be reallocated.

In the flowchart for the space sorting means D in FIG. 4, when a cutting point exists and no cut triangle exists at S13, one type of affiliated space number is set for a cell in the same manner as for a non-boundary cell.

When cut triangles exist at S13, a cut triangle that includes a cut ridge line with a small number is selected, and an arbitrary side, either the reverse side or the obverse side of the triangle, is selected.

When the side opposite the reverse or obverse side is reached by performing a cycle search, for designating a different space number for each space defined by a cut triangle that shares a side and that has the smallest angle formed by its planes, an affiliated space number that is the same as that for a non-boundary cell, and that is the only one, is designated.

It should be noted that a cycle, which indicates the inside of cell planes originally formed of only ridge lines that inherently include no cutting points, may be employed for performing the fine division of the cycle even when there exist cutting points (so as to face the inside in the same manner).

The following cycle tracing is performed for the side (direction) specifying cut triangle (at the start cycle) that was selected above. When the start cycle is reached, the cycle tracing is terminated.

Further, the reverse side of the side-attached cut triangle that is selected above is also examined. When the reverse side is the outside of the pertinent cell, the cycle tracing skips this and proceeds to the next triangle. After the reverse side has been examined, a check end flag is set. When the reverse and obverse sides of all the cut triangles have been examined, the cycle tracing is terminated.

Figure 5:
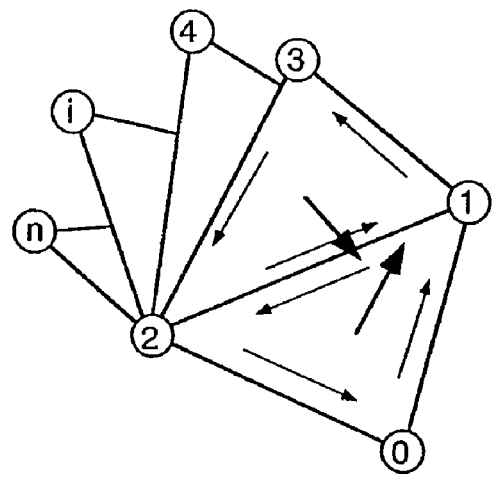
[FIG. 5] An explanatory view illustrating a cycle tracing means for selecting a cut triangle that shares sides and that has the smallest angle formed by its planes.

FIG. 5 is a diagrammatic view for explaining cycle tracing means for selecting a cut angle that shares a side and that has the smallest angle formed by its planes. In this drawing, four cut triangles share a side 1-2. The "cycle tracing" method will now be explained.

In FIG. 5, it is assumed that the side specifying cut triangle that was selected above is Δ(0, 1, 2). Here, ( ) represents an ordered pair. Numbers denote cutting points, and it is premised that adjacent cut triangles that share a side are to be traced.

Next, an arbitrary cut side is selected. In this example, the side 1-2 that is used in common is defined as a directed side (1, 2), as determined by a cycle.

In this example, directed triangles that share the selected directed side (1, 2) are defined as Δ(2, 1, 3), (2, 1, 4), - - - (2, 1, n) in the forward order. It should be noted that triangles directed in the "forward order" are triangles which are traced in the reverse order along the side 1-2, and for which the normal lines of planes are directed within the same space.

When, from among the triangles directed in the forward order, a cut triangle that has the smallest directed dihedral angle formed with the sided cut triangle Δ(0, 1, 2), i.e., a cut triangle that has the smallest (near −π) angle formed by the normal lines of two planes, is selected, it is found that the side-attached cut angle Δ(0, 1, 2), which is a target, and the selected cut angle (Δ(2, 1, 3) in this example)) share the same space.

An explanation will now be provided for a method for selecting, from among triangles directed in the forward order, a cut triangle that has the smallest directed dihedral angle formed with the side-attached cut triangle Δ(0, 1, 2) that is a target.

Figure 6:
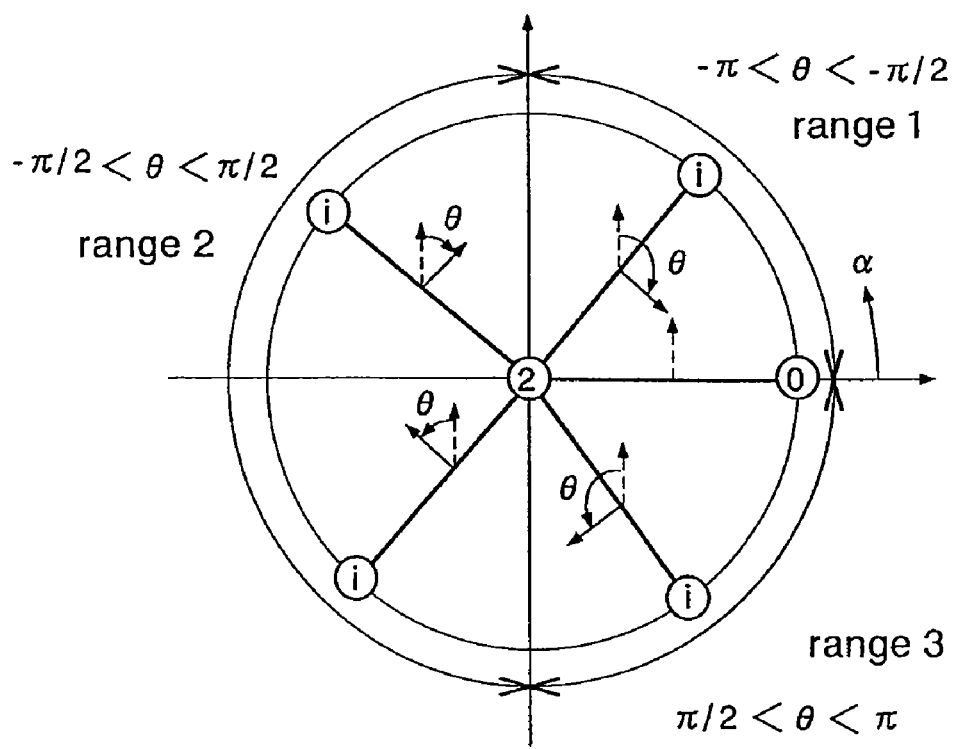
[FIG. 6] A diagrammatic view showing a relation between angles formed by a target triangle and triangles in the forward order.

FIG. 6 is a diagrammatic view showing the relation of angles formed by a target triangle and triangles in the forward order. In this drawing figure, the planes of triangles are indicated by line segments, a target triangle is represented by 2-0, and the triangles in the forward order are represented by three line segments 2-i.

In FIG. 6, assuming that an angle formed by two planes is α(0 to 2π), an angle θ formed by the normal lines of two planes is −π through +π. Further, an angle θ formed by the normal lines of two planes is represented by formula (1) in expression 1.

[Expression 1]

$$\tan\theta = \frac{\vec{n_0} \times \vec{n_i}}{(\vec{n_0}, \vec{n_i})} \cdot \frac{P_1 \to P_2}{\|P_1 \to P_2\|} \quad (1)$$

Therefore, based on formula (1), a cutting point i need only be selected to provide the smallest results for $$|1,2| \tan\theta = ((0,1)\times(0,2))\times((i,2)\times(i,1))\cdot(1,2)/(0,1)\times (0,2)\cdot(i,2)\times(i,1) \quad (2)$$

It should be noted that × denotes an outer product and · denotes an inner product.

When inner=((0, 1)×(0, 2))·((i, 2)×(i, 1)), outer=((0, 1)×(0, 2))×((i, 2)×(i, 1)), and inout=outer·(i, 2) are defined for formula (2), formula (3) is obtained.

$$|1,2| \tan\theta = \text{inout}/\text{inner} = \text{outer}\cdot(i,2)/\text{inner} \quad (3)$$

It should be noted, however, that when the range within which tan θ is sequential is −π/2 through +π/2, the range must be divided by −π through −π/2 and π/2 through π, and the case in which cos θ=0 must be excluded in advance. Hereinafter, a range of from −π through −π/2 is called section 1, a range of from −π/2 through +π/2 is called section 2 and a range of from π/2 through π is called section 3.

Figure 7:
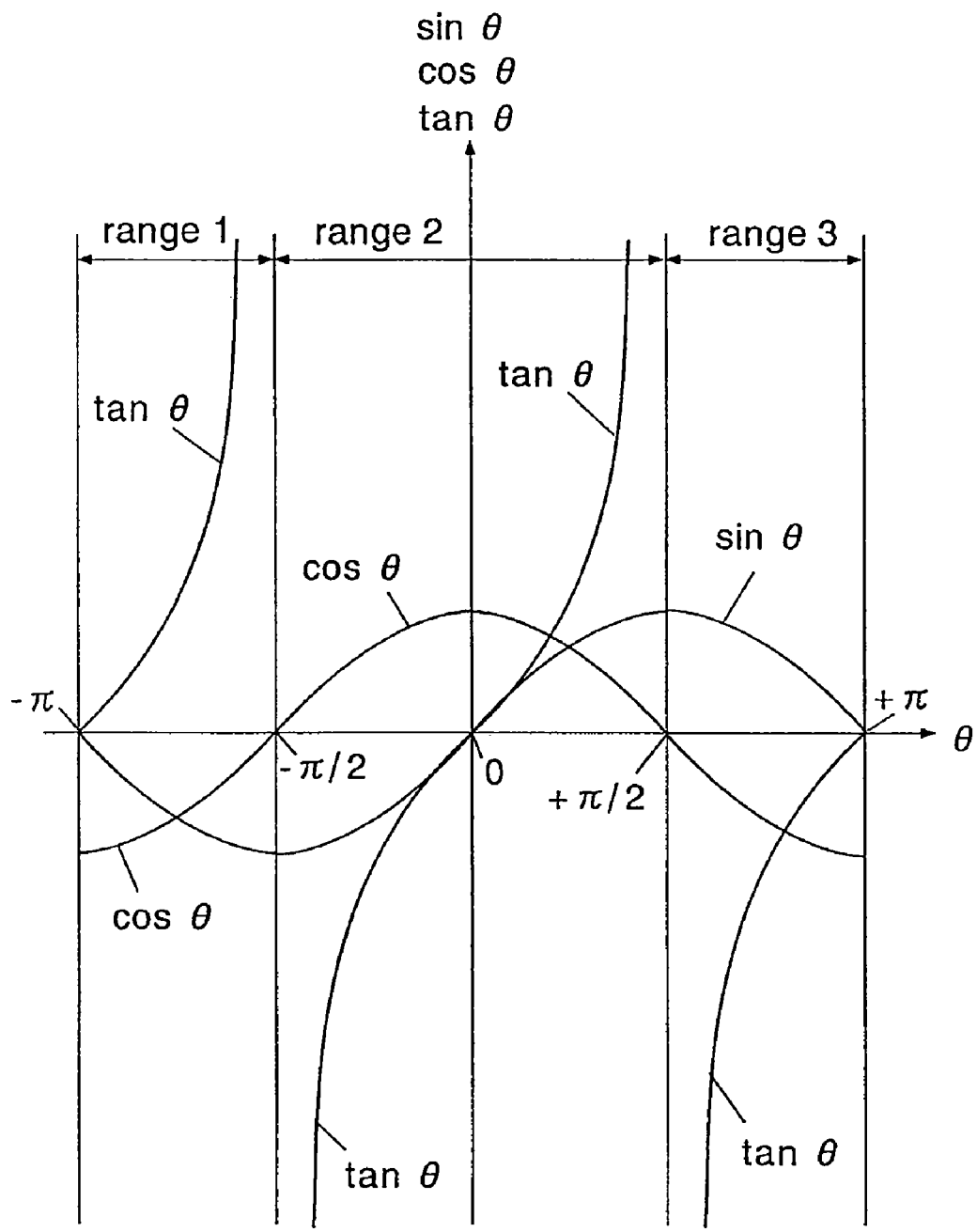
[FIG. 7] A diagrammatic view showing a relation between angle θ and sin θ, cos θ and tan θ.

FIG. 7 is a diagrammatic view showing the relation between an angle θ and sin θ, cos θ and tan θ. While referring to this drawing figure, it is apparent that, in sections 1, 2 and 3, tan θ is always an increasing function and that, when a smaller value of tan θ is selected in each section, a cut triangle having a small θ can be selected. Further, in formula (3), "inout" and "inner" represent scalar amounts respectively proportional to sin θ0 and cos θ.

Figure 8:
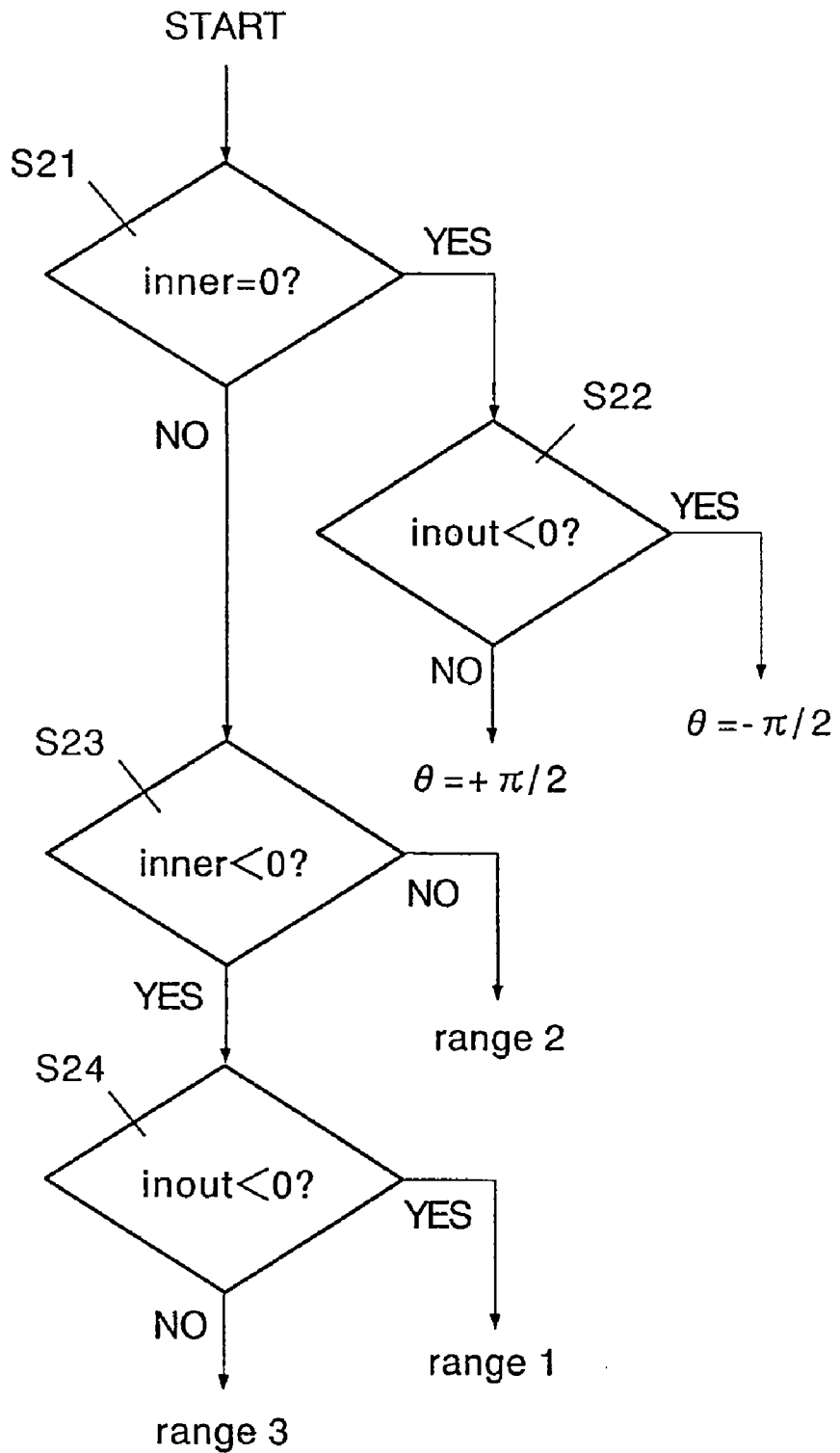
[FIG. 8] A flowchart showing a method for identifying individual sections.

FIG. 8 is a flowchart showing a method for identifying each section. In this flowchart, when inner is 0 at S21, cos θ=0, and when inout (sin θ) is negative, θ=−π/2 is established, or when inout (sin θ) is positive, θ=+π/2 is established.

When inner (cos θ) is positive at S23, the section is identified as section 2 by referring to FIG. 7. When inout (sin θ) is negative at S24, the section is identified as section 1 by referring to FIG. 7, or when inout (sin θ) is positive, the section is identified as section 3.

Therefore, according to the method shown in FIG. 8, the sections in cases wherein θ=−π/2 and +π/2, and the other cases, are identified, and a section with a small number is selected. Further, in the same section, only a small value of tan θ need be selected, so that a cut triangle having a small θ can be selected.

The external data externally input is polygon data representing a polygon, a tetrahedron or hexahedron element to be used for the finite element method, curved surface data to be used for a three-dimensional CAD or CG tool, or other data such that the surface of a three-dimensional object is expressed by using information consisting of partial planes and curved surfaces.

In addition to these data, the external data 12 may be data prepared directly through manual input via a V-CAD original interface, and (2) surface digitized data obtained by using a measuring device, a sensor or a digitizer, or volume data that includes internal information, such as voxel data used for CT scanning, MRI and general volume rendering.

Output data is VCAD data that include boundaries, for which labels (space numbers) are attached to spaces, and cells having the minimum space resolution or higher. The VCAD data comprised of the overall space filled with cells (boundary cells) that directly have a boundary and cells (non-boundary cells) that do not have a boundary.

As described above, the method for cell labeling of volume data of the present invention, and the program for same, can enjoy the following effects.

(1) It is possible to sort out spaces that belong to multimedia and have a complicated shape, a process that can not be solved by the conventional method.

(2) Thus, input targets dealt with by VCAD tend to have more variety. That is, not only two media, i.e., the outside and inside media that employ, as a boundary, two manifolds that are completely closed solids, but also one medium to three or more media that employ, as a boundary, a non-manifold (face branching or a hole) or an open shell, can be dealt.

(3) The same data can be employed to sequentially perform expressions, analyzing and manufacturing, inspection and evaluation for an object that contains one material or three or more materials (multi-media), or a mixture with a fluid.

(4) Since an affiliated space is provided not for the vertex of a cell, but for the obverse and reverse sides of boundary data (inside the cell), media and various attributes (affiliated spaces) can be quickly obtained through cells, even in an environment distributed by a plurality of computers and users.

It should be appreciated that the present invention is not limited to the above-described embodiments and, of course, can be variously modified without departing from the gist of the present invention.

REPLACEMENT FIGURE 4: should read,
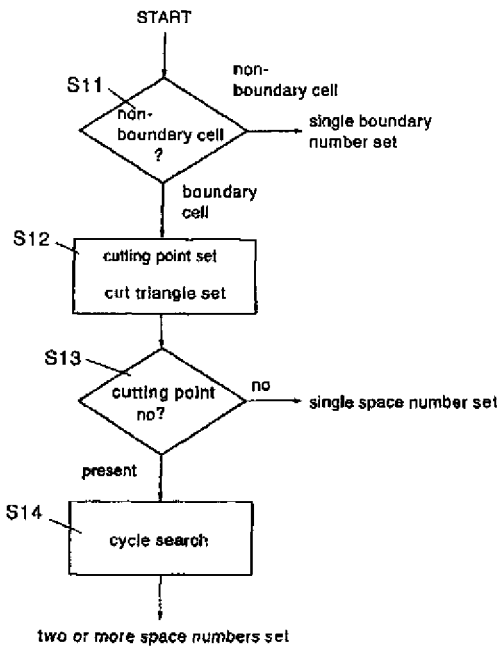

The invention claimed is:

1. A method for cell labeling of volume, wherein the method comprises the steps of:
   (a) obtaining external data including boundary data for an object by means of external data acquisition means through employment of a computer;
   (b) entering the external data into the computer by means of external data input means;
   (c) dividing the external data into rectangular parallelepiped cells that boundary planes intersect perpendicularly by means of cell dividing means;
   (d) sorting respective of the divided cells into boundary cells that include boundary data and non-boundary cells that do not include boundary data by means of cell sorting means;
   (e) assigning different space numbers for respective spaces where the cells are partitioned according to the boundary data by means of space sorting means; and
   resetting space numbers of adjacent cells that are not partitioned according to the boundary data to a same space number by means of space number compression means reassigns, wherein,
   by means of the space sorting means,
      i. assigning a single space number when a cell is a non-boundary cell; and
      ii. setting, for boundary data, a cutting point at which the ridge line of the boundary cell is cut, and a single or a plurality of cut triangles that are connected only along sides through the cutting point when a cell is a boundary cell; and
   (f) setting a single space number when there is a cutting point and there is no cut triangle; and, during step (e),
      iii. permitting cycle search means for tracing a course for a cut triangle that shares a side, and has the smallest angle formed by faces, to sequentially perform for all of the cut triangles, when there is a plurality of cut triangles that are connected along sides.

2. The method for cell labeling of volume data according to claim 1, wherein, by means of the cycle search means, for two faces formed of obverse and reverse faces that constitute a cut triangle, a space number is set for a medium that is allowed to exist by a half space pointed by a normal vector that is determined by a cycle of sides having a direction.

3. The method for cell labeling of volume data according to claim 2, wherein, by means of the cycle tracing means, two or more cut triangles which share sides and directions which are the opposite are traced, and a space number is set for a space enclosed by a closed boundary when a cut triangle at the start is finally reached.

4. The method for cell labeling of volume data according to claim 1, wherein the cycle search means is performed sequentially or in a parallel distributed manner.

5. The method for cell labeling of volume data according to claim 1, wherein the cell dividing means performs octantal re-division of the rectangular parallelepiped cells until appropriate cutting points are obtained, so as to reconstruct boundary shape elements that constitute the boundary planes that are included in the external data, or until an arbitrary number of times, determined by a user, is reached.

6. The method for cell labeling of volume data according to claim 1, wherein the space sorting means repetitively or recursively scans all the rectangular parallelepiped cells sequentially in three directions X, Y and Z.

7. The method for cell labeling of volume data according to claim 1, wherein the external data includes physical property values for an object and others that enclose the object, and correlates, with the physical property values, the space numbers assigned by the space sorting means.

8. A program, stored on a computer readable medium, for cell labeling of volume data which employs a computer, wherein the program causes the computer to perform:
   (a) an external data acquiring step of obtaining external data including boundary data for an object;
   (b) an external data input step of inputting the external data into the computer;
   (c) a cell dividing step of dividing the external data into rectangular parallelepiped cells that boundary planes intersect perpendicularly;
   (d) a cell sorting step of sorting each of the divided cells into boundary cells that include boundary data and non-boundary cells that do not include boundary data;
   (e) a space sorting step of assigning different space numbers for respective spaces where the cells are partitioned according to the boundary data, and
   a space number compression step of resetting a same space number for adjacent cells that are not partitioned according to the boundary data, wherein
   the space sorting step comprises the steps of
      i. assigning a single space number when a cell is a non-boundary cell; and
      ii. setting, for boundary data, a cutting point at which the ridge line of the boundary cell is cut, and a single or a plurality of cut triangles that are connected only along sides through the cutting point when a cell is a boundary cell; and
   (f) setting a single space number when there is a cutting point and there is no cut triangle; and, during step (e),
      iii. permitting cycle search means for tracing a course for a cut triangle that shares a side, and has the smallest angle formed by faces, to sequentially perform for all of the cut triangles, when there is a plurality of cut triangles that are connected along sides.

* * * * *

UNITED STATES PATENT AND TRADEMARK OFFICE
CERTIFICATE OF CORRECTION

| | | |
|---|---|---|
| PATENT NO. | : 7,734,059 B2 | Page 1 of 2 |
| APPLICATION NO. | : 11/568669 | |
| DATED | : June 8, 2010 | |
| INVENTOR(S) | : Kiwamu Kase et al. | |

It is certified that error appears in the above-identified patent and that said Letters Patent is hereby corrected as shown below:

Figure 4, step (S13) "prsent" should read --present-- and "noun" should read --no-- in two places, inside and outside of the (S13) figure. Annotated Figure 4 is shown below. Replacement Figure 4 follows on page 2.

ANNOTATED:

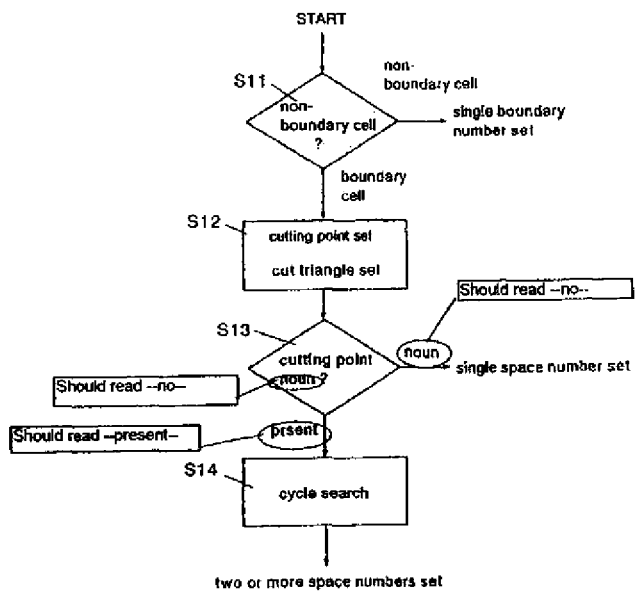

Signed and Sealed this

Fourteenth Day of February, 2012

David J. Kappos
*Director of the United States Patent and Trademark Office*